United States Patent
Gonzalez De Langarica et al.

(10) Patent No.: US 11,750,667 B2
(45) Date of Patent: Sep. 5, 2023

(54) NETWORK NODE, IP MULTIMEDIA SUBSYSTEM (IMS) NODE, OVER THE TOP (OTT) DIGITAL ASSISTANT, AND METHODS IN A COMMUNICATIONS NETWORK

(71) Applicant: Telefonaktiebolaget LM Ericsson (publ), Stockholm (SE)

(72) Inventors: Ester Gonzalez De Langarica, Vitoria (ES); Jose Manuel Alfonso, Enskededalen (SE); Charles Hegarty, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 17/595,974

(22) PCT Filed: Jun. 4, 2019

(86) PCT No.: PCT/SE2019/050510
§ 371 (c)(1),
(2) Date: Nov. 30, 2021

(87) PCT Pub. No.: WO2020/246919
PCT Pub. Date: Dec. 10, 2020

(65) Prior Publication Data
US 2022/0239710 A1    Jul. 28, 2022

(51) Int. Cl.
*H04L 65/1093* (2022.01)
*H04L 65/1016* (2022.01)
(Continued)

(52) U.S. Cl.
CPC ...... *H04L 65/1093* (2013.01); *H04L 65/1016* (2013.01); *H04L 65/1069* (2013.01); *H04L 65/403* (2013.01)

(58) Field of Classification Search
CPC ............ H04L 65/1093; H04L 65/1016; H04L 65/1069; H04L 65/403
(Continued)

(56) References Cited

U.S. PATENT DOCUMENTS

2010/0037151 A1*  2/2010  Ackerman ............. G06Q 10/10
                                                                715/753
2010/0325212 A1   12/2010  Mahdi
(Continued)

FOREIGN PATENT DOCUMENTS

EP       3055949 B1    11/2018

OTHER PUBLICATIONS

Dan York, What is an Over-The-Top (OTT) Application or Service?—A Brief Explanation, Jul. 10, 2012, disruptivetelephony.com, https://www.disruptivetelephony.com/2012/07/what-is-an-over-the-top-ott-application-or-service-a-brief-explanation.html (Year: 2012).*

(Continued)

*Primary Examiner* — Zi Ye
(74) *Attorney, Agent, or Firm* — Nicholson De Vos Webster & Elliott LLP

(57) ABSTRACT

A network node for handling access to sharing media in a media session in an Over The Top (OTT) Digital Assistant (DA). The media shall be shared between a first participant A and a second participant B in a communications network. The first participant A has access to sharing media in the media session in the OTT DA. The network node receives a request for access from the OTT DA. The request for access relates to the first participant A requesting access for the second participant B to sharing media in the media session in the OTT DA. The network node forwards the request to an IP Multimedia Subsystem (IMS) node in the communications network, to trigger the IMS node to switch on the (Continued)

sharing of media in the media session in the OTT DA for the second participant B, when authorised by the participant B.

13 Claims, 16 Drawing Sheets

(51) Int. Cl.
*H04L 65/1069* (2022.01)
*H04L 65/403* (2022.01)

(58) Field of Classification Search
USPC .......................................................... 709/204
See application file for complete search history.

(56) References Cited

U.S. PATENT DOCUMENTS

2012/0300677 A1* 11/2012 Forsberg ............. H04L 65/4038
370/261
2014/0222894 A1* 8/2014 Gangadharan ...... H04L 65/1033
709/203

OTHER PUBLICATIONS

International Search Report and Written Opinion for Application No. PCT/SE2019/050510, dated Jan. 30, 2020, 13 pages.
OMA Open Mobile Alliance, "NGSI Call Control and Configuration," May 29, 2012, 45 pages, OMA-TS-NGSI_Call_Control_and_Configuration-V1_0-20120529-A, Approved Version 1.0, Open Mobile Alliance Ltd.

* cited by examiner

601. Receive from first participant A, a request for access relating to the first participant A requesting access for a second participant B to share media of a media session in an OTT DA, which request is received as a keyword chosen by the first participant A to activate a request for access.

602. Triggered by the keyword, send the request via a network node to an IMS node in the communications network, to trigger the IMS node to switch on the sharing of media in the media session in the OTT DA for the second participant B when authorised by the second participant B.

Fig. 6
Method in OTT device 125

701. Receive from OTT DA, a request for access, relating to first participant (A) requesting access for second participant (B) to share media in the media session in the OTT DA.

702. Forward the request to an IMS node in the communications network, to trigger the IMS node to switch on the sharing of media in the media session in the OTT DA for the second participant B, when authorised by the participant B.

Fig. 7
Method in network node 150

Method in IMS node 130

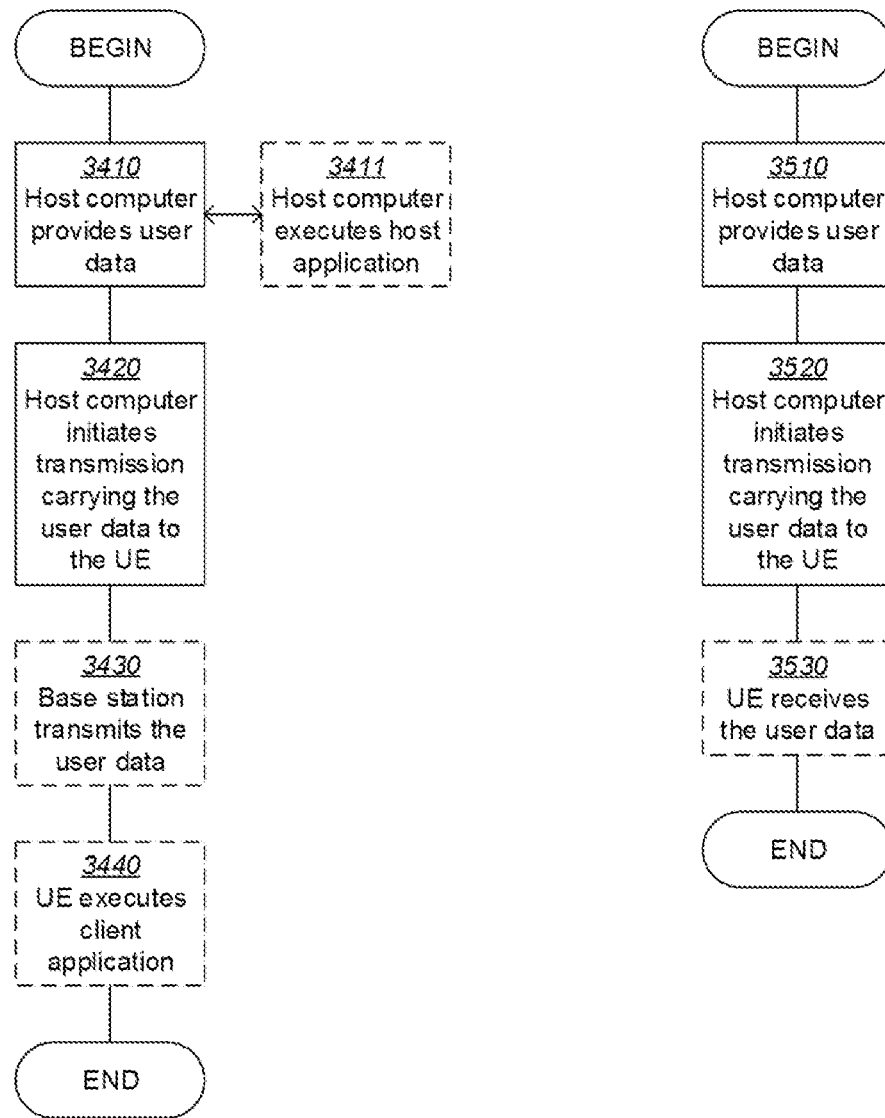

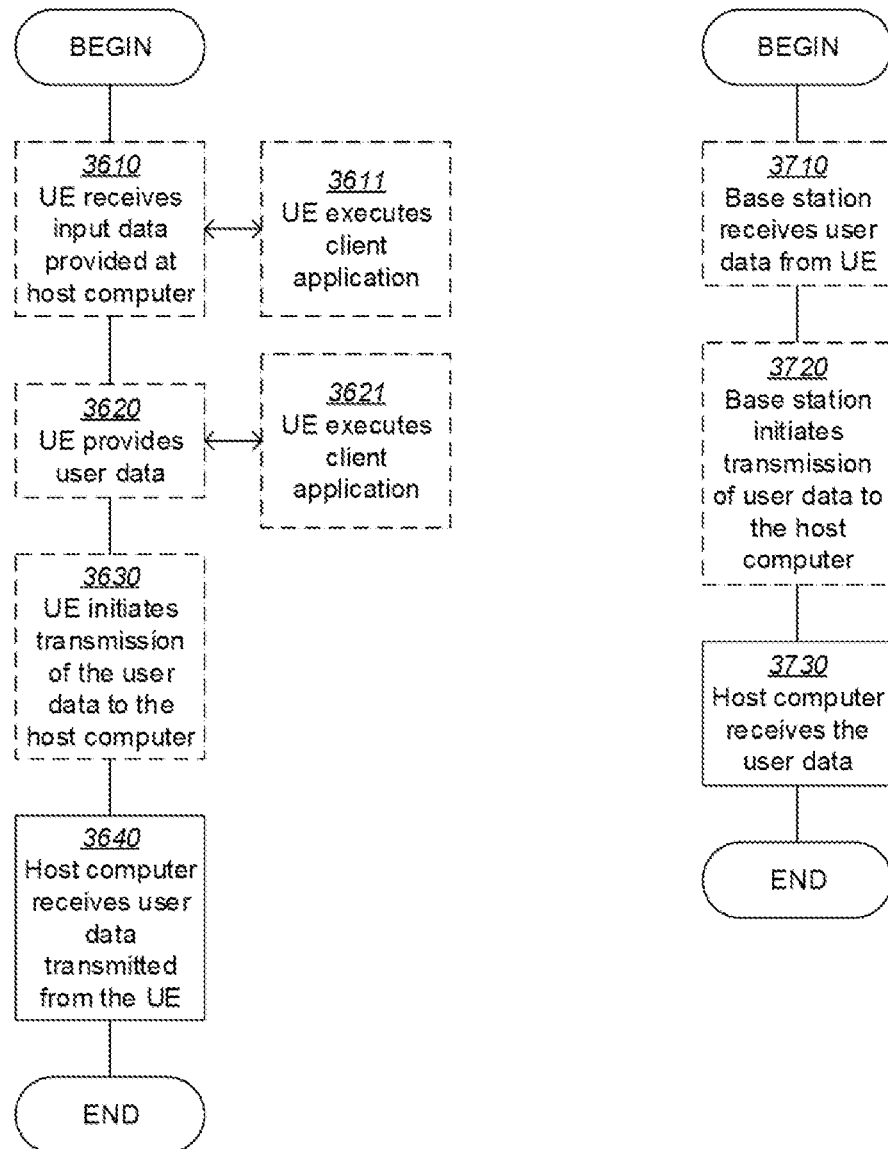

NETWORK NODE, IP MULTIMEDIA SUBSYSTEM (IMS) NODE, OVER THE TOP (OTT) DIGITAL ASSISTANT, AND METHODS IN A COMMUNICATIONS NETWORK

CROSS-REFERENCE TO RELATED APPLICATIONS

This application is a National stage of International Application No. PCT/SE2019/050510, filed Jun. 4, 2019, which is hereby incorporated by reference.

TECHNICAL FIELD

Embodiments herein relate to a network node, an IP Multimedia Subsystem (IMS) node, an Over The Top (OTT) Digital Assistant (DA) and a methods therein. In particular, they relate to handling access to sharing media in a media session in the OTT DA.

BACKGROUND

In a typical wireless communication network, wireless devices, also known as wireless communication devices, mobile stations, stations (STA) and/or user equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Over-The-Top (OTT) services have been introduced allowing a third party telecommunications service provider to provide services that are delivered across an Internet Protocol (IP) network. The IP network may e.g. be a public internet or cloud services delivered via a third party access network, as opposed to a carrier's own access network. OTT may refer to a variety of services including communications, such as e.g. voice and/or messaging, content, such as e.g. TV and/or music, and cloud-based offerings, such as e.g. computing and storage.

A further OTT service is a Digital Assistant (DA). The DA may perform tasks or services upon request from a user of a UE.

IMS is a general-purpose, open industry standard for voice and multimedia communications over packet-based IP networks. It is a core network technology, that may serve as a low-level foundation for technologies like Voice over LTE (VoLTE) Voice over IP (VoIP), Push-To-Talk (PTT), Push-To-View, Video Calling, and Video Sharing.

The core network node may detect a keyword, which may also be referred to as a hot word, indicating that the user is providing instructions to the DA and may forward the instructions to a network node controlled by a third party service provider, the network node may e.g. comprise a DA platform.

An intent is an abstract description of an operation to be performed. The text describing an intent when used herein is written with the text font Courier New Italic. An intent may be used with context #startActivity (Intent) to launch an Activity, broadcastIntent to send it to any interested BroadcastReceiver components, and Context.startService(Intent) or Context.bindService (Intent, ServiceConnection, int) to communicate with a background Service.

An Intent provides a facility for performing late runtime binding between the code in different applications. Its most significant use is in a launching of activities, where it may be thought of as the glue between activities. It is basically a passive data structure holding an abstract description of an action to be performed.

When a user calls startActivity( ) or startActivityForResult( ) and pass it as an implicit intent, the system resolves the intent to an app that can handle the intent and starts its corresponding Activity. If there's more than one app that can handle the intent, the system presents the user with a dialog to pick which app to use.

E.g. a user is saying to its DA: "DA, call Bob". "DA" is in this case the keyword, or anything configured by the operator, and "Call Bob" is the "intent" The trigger to wake up the DA is the keyword. Then the intent can be call Bob or other actions available.

The DA platform may e.g. be a bot of a company providing a certain service, such as e.g. a taxi service or a food delivery service. An Internet bot, also known as a web robot, a WWW robot or simply a bot, is a software application that runs automated tasks such as scripts, over the Internet. Typically, bots perform tasks that are both simple and structurally repetitive, at a much higher rate than would be possible for a human alone.

The DA platform may then forward the instructions to a further network node, which may e.g. be an Application Server (AS) node, an agent server node, a skill server node or similar. This further network node has access to the core network node such as an IMS node via a Service Exposure Application Programming Interface (API). Thereby the DA may access the IMS node and perform services towards the core network node.

The DA platform is often required to pay a fee to the operator in order to be reachable by the operator's DA users. The user may also be required to pay fees to the operator and network provider for the usage of DA services. The operator may further be required to pay fees to the network provider for every transaction performed via the Service Exposure API.

A further way to implement the DA may be to provide the user with direct access to the network node controlled by the third party service provider comprising the DA platform. This may e.g. be done using a dedicated UE having access to the network node. This way of implementing the DA is commonly referred to as an OTT-controlled DA.

One of the services that can be invoked may e.g. be a telephony services or bot, implemented by the operator.

Some different models to support voice controlled digital assistants in IMS have been discussed. The following section shows the in-call DA function is implemented on each model, whereby the user avails of their DA service to interact with and/or manipulate on-going calls. Note that this use case is not feasible in the OTT controlled DA but only in the Operator-controlled DA and the OTT-delegated DA.

Operator-Controlled DA

Regarding Operator-controlled DA, the operator has its own DA. All the functionality is contained within the operator domain such as keyword detection, request fulfillment, media handling, service manipulation etc. Further, no service exposure towards an OTT cloud is needed.

FIG. 1 depicts an operator controlled DA. One of the services that may be invoked is telephony services or bot, implemented by the operator.

The user Alice's UE is not impacted. The operator controls the whole DA model comprising keyword detection, media handling and request fulfillment. As the operator controls the model, i.e. all session legs "in-call DA" functionality is supported in this model. A user Alice of a first UE, a first participant, wishes to have a call, here referred to as a conference, with a second participant, the user Bob using a second UE. The operator DA joins the conference as a participant and the logic will only starts when the keyword is detected every time a keyword is detected. In order to detect that the keyword has been said the operator DA must be listening to the conference from the first moment. In other words, the operator is there from the start but the logic will only starts when the keyword is detected.

The user Alice says Alice says: "DA, call Bob". "DA" would be the keyword, or anything configured by the operator, for example OK, Telia, Telenor, Hey Tele2, etc. "Call Bob" is an intent. The trigger to wake up the DA is the keyword. Then the intent may be "call Bob" or other actions available to be used for triggering the action to call the user Bob. The request may come as a hotword to wake up the DA" and "keywords defining the intent or request.

The keyword is sent as SIP audio data to an IMS core network node 10 used by the operator. RTP is used for audio.

The IMS core network node detects the keyword comprising the RTP audio data and invokes S04 the operator DA 10 to joins the conference.

The user Alice has an ongoing call S06 with the user Bob. The DA is listening from the start. As soon as the user says, Hi Telia, or OK, Telenor (keyword), the DA will then "wake up" and listen to the intent, i.e. call Bob.

OTT-Controlled DA

Regarding OTT-controlled DA, the keyword detection is done by the OTT DA and the request is fulfilled in the OTT cloud. Sessions are initiated from the OTT DA towards the operator network. When the request relates to service interaction and/or service manipulation, the OTT DA must use IMS service exposure APIs to access IMS capabilities. An OTT DA may e.g. comprise an OTT DA device such as a smart speaker such as e.g. Amazon echo or Google Home speakers, and e.g. the OTT DA may comprise an application interacting with the IMS network, and an OTT platform. A Service Exposure API when used herein means an API exposing the IMS capabilities to third party applications. These capabilities are for example call handling, message handling, supplementary service handling etc.

FIG. 2 depicts an OTT controlled DA. Alice owns the UE and the OTT DA such as an Amazon echo. One of the services that may be invoked is the telephony services or bot, implemented by the operator.

In this model, the user Alice invokes the OTT DA, such as e.g. of Amazon or Google by saying "Operator X, call Bob" "Operator X, add Charlie to the call which is a keyword.

Keyword detection is done locally in the OTT DA. This voice keyword is streamed to the OTT Skill Platform. Service Exposure is needed in the IMS network to access IMS capabilities from the OTT. Therefore the OTT Skill Platform sends a Hypertext Transfer Protocol (HTTP)/Representational State Transfer (REST) "add Charlie to the call" to the skill/agent server of the operator. The skill/agent server parses this request and matches the identity to the IMS user identity, e.g. private Id, or public Id, and sends e.g. an HTTP/REST "IMS Service Exposure API addParticipant (Charlie) to an IMS network node.

HTTP/REST is a protocol supported between the skill server and the IMS core network. SIP/RTP in the Figures relate to the IMS protocol.

Note that this model does not support the in-call DA case as the DA has no knowledge of ongoing sessions in the operator network.

Operator-OTT Delegated DA

Regarding Operator/OTT-delegated DA, media is handled by the operator. Keyword detection is performed by the OTT DA such as an OTT device e.g. a smart speaker, which e.g. may be a conference party. Fulfillment of the request done by the OTT DA application.

FIG. 3 depicts an Operator-OTT delegated DA. This model, the user such as Alice may, in the middle of a call, referred to as conference, invoke her favorite OTT DA, e.g. of Google, or Amazon, using its keyword. Alice says: "DA, I want to know what the capital of Spain is" wherein, "DA" is the keyword and "I want to know what the capital of Spain" is the intent". Only the voice from the user Alice is going up to the OTT DA, referred to as the OTT DA platform. To support this, the OTT DA must be in the call when the user Alice makes her request, the OTT DA becomes a conference participant. The OTT DA detects keyword and fulfills the request in the same call. Fulfills the request means that the OTT DA analyzes the user intent and will proceed with the logic to fulfill it. In the example below it will consult some sources and it will answer "The capital of Spain is Madrid". When the user Alice's request is related to the IMS network, the OTT DA must use the Service Exposure APIs to access the IMS capabilities in the IMS network. This is performed by the OTT DA sending to the Skill/Server agent, a HTTP/REST "Keyword detect and request fulfillment". The Skill/Server agent then sends an HTTP/REST "IMS exposed APIs" IMS node. The IMS node then will use the IMS exposed API-s needed to fulfill the user's request. E.g. make a call to a person, or the keyword detect information is not included in the HTTPREST. The keyword detect is a trigger for the skill server to start certain logic, but the info about the keyword is never transmitted anywhere else.

SUMMARY

As a part of developing embodiments herein the inventors identified a problem which first will be discussed.

In the Operator-OTT delegated DA model, described above, the media of both call participants is reaching the served user's Digital Assistant by default.

However, participants in the call with the served user don't necessarily consent to their media being sent to the OTT DA. I.e., if Alice calls Bob and she has Google as an OTT DA Bob does not want his audio to be uploaded to the OTT DA e.g. in the Google cloud or Amazon cloud or ant OTT cloud, without his consent.

On the other hand, if the media of the participants is not sent to the OTT DA, it is limiting the number of use cases that are possible to implement. For example, recording a call by the OTT DA, or the OTT DA being shared among all the participants.

Thus, if a participant's media is uploaded to the OTT DA it causes a privacy problem, and if a participants media is not uploaded to the OTT DA it limits the number of use cases that can be implemented.

An object of embodiments herein is improve the performance of a communications network using OTT DAs.

According to an aspect of embodiments herein, the object is achieved by a method performed by a network node, for handling access to sharing media in a media session in an Over The Top, OTT Digital Assistant, DA. The media shall be shared between a first participant A and a second participant B in a communications network. The first participant A has access to sharing media in the media session in the OTT DA. The network node receives a request for access from the OTT DA. The request for access relates to the first participant A requesting access for the second participant B to sharing media in the media session in the OTT DA. The network node forwards the request to an IP Multimedia Subsystem, IMS, node in the communications network, to trigger the IMS node to switch on the sharing of media in the media session in the OTT DA for the second participant B, when authorised by the participant B.

According to another aspect of embodiments herein, the object is achieved by a method performed by an IP Multimedia Subsystem, IMS, node, for handling access to sharing media in a media session in an Over The Top, OTT Digital Assistant, DA. The media shall be shared between a first participant A and a second participant B in a communications network. The first participant A has access to sharing media in the media session in the OTT DA. The IMS node receives a request for access from a network node. The request relates to the first participant A requesting access for the second participant B to sharing media of the media session in the OTT DA. The request is received via the OTT DA. The IMS node sends a request to the second participant B to authorise the sharing of the media of the media session in the OTT DA for the second participant B.

The IMS node is then triggered to switch on the sharing of media of the media session in the OTT DA for the second participant B, when authorised by the participant B.

According to a further aspect of embodiments herein, the object is achieved by a method performed by an Over The Top, OTT Digital Assistant, DA, for handling access to sharing media in a media session in the OTT DA. The media shall be shared between a first participant A and a second participant B in a communications network. The first participant A has access to sharing media in the media session in the OTT DA.

The OTT DA receives a request for access from the first participant A. The request relates to the first participant A requesting access for the second participant B to sharing media of the media session in the OTT DA. The request is received as a intent chosen by the first participant A to activate a request for access.

Triggered by the intent, the OTT DA sends the request via a network node server to an IP Multimedia Subsystem, IMS, node in the communications network, to trigger the IMS node 130 to switch on the sharing of media in the media session in the OTT DA 125 for the second participant B when authorised by the second participant B.

According to a yet further aspect of embodiments herein, the object is achieved by a network node configured to handle access to sharing media in a media session in an Over The Top, OTT Digital Assistant, DA. The media shall be shared between a first participant A and a second participant B in a communications network. The first participant A is adapted to have access to sharing media in the media session in the OTT DA. The network node is further configured to:

Receive from the OTT DA, a request for access, which request is adapted to relate to the first participant A requesting access for the second participant B to share media of the media session in the OTT DA, and forward the request to an IP Multimedia Subsystem, IMS, node in the communications network, to trigger the IMS node to switch on the sharing of media of the media session in the OTT DA for the second participant B when authorised by the participant B.

According to an aspect of embodiments herein, the object is achieved by an IMS node configured to handle access to sharing media of a media session in an Over The Top, OTT Digital Assistant, DA. The media is to be shared between a first participant A and a second participant B in a communications network. The first participant A has access to sharing media in the media session in the OTT DA. The IMS node is further configured to:

Receive a request for access from a network node, which request relates to the first participant A requesting access for the second participant B to sharing media of the media session in the OTT DA, which request is adapted to be received via the OTT DA, send a request to the second participant B to authorise the sharing of the media of the media session in the OTT DA for the second participant B, and trigger to switch on the sharing of media of the media session in the OTT DA for the second participant B, when authorised by the participant B.

According to another aspect of embodiments herein, the object is achieved by an Over The Top, OTT Digital Assistant, DA, configured to handling access to sharing media in a media session in the OTT DA. The media is adapted to be shared between a first participant A and a second participant B in a communications network. The first participant A is adapted to have access to share media in the media session in the OTT DA. The OTT DA is further configured to:

Receive a request for access from the first participant A, which request for access is adapted to relate to the first participant A requesting access for the second participant B to share media of the media session in the OTT DA, and which request is adapted to be received as a intent chosen by the first participant A to activate a request for access, and triggered by the intent, send the request for access via a network node agent server to an IP Multimedia Subsystem, IMS, node in the communications network 100, to trigger the IMS node to switch on the sharing of media in the media session in the OTT DA for the second participant B, when authorised by the second participant B.

An advantage of embodiments herein is that this mechanism allows the OTT DA to get not just the media coming from its served first user but from all the call participants such as the second user, after they consent to it. The OTT DA may then implement use cases such as recording and storing a call in the OTT DA or sharing the OTT DA such as a DA among all call participants.

Another advantage of embodiments herein is the respect of regulations and privacy of user's. Further, it is possible to share a Digital Assistant among the call participants and to implement services like Call Translation and Call Recording.

BRIEF DESCRIPTION OF THE DRAWINGS

Examples of embodiments herein are described in more detail with reference to attached drawings in which:

FIG. 6 is a flowchart depicting embodiments of a method in a OTT DA.
FIG. 7 is a flowchart depicting embodiments of a method in a network node.
FIGS. 15 to 18 are flowcharts illustrating methods implemented in a communication system including a host computer, a base station and a user equipment.

DETAILED DESCRIPTION

Example embodiments herein provide an API exposed by an IMS network node, referred to as IMS node, so that a DA platform, also referred to as DA OTT, OTT client and OTT DA, can request access to media related to the participants in a conference call, only when their consent is granted.

Since the users participating in the call may not have a contractual relationship with the OTT DA related to the DA platform, an information message will be be sent to the participant. This message may e.g. be an audio or text message. Depending on the regulations, if explicit consent is required, the IMS node must request for the participants, i.e. user's input and get the consent.

The network media control function may ensure that the media of all consensual participants will then be uploaded to the OTT DA. The consent may apply only for the duration of the session.

Embodiments herein may standardize an API to:
Trigger the request to the IMS node in the IMS network to switch on/off the media towards the OTT DA.
Send an information message to all participants in the call with the consent request.
If explicit consent is needed, send a consent request and collect the answer from all participants. Only the media of those consenting will be included in the media leg toward the OTT DA.

New API may be provided:
accessMediaParticipants (participant list, on off, info message)
Parameters:
participant list, a list of participants the OTT DA wants to access the media.
info message, a message informing the participants user about whether the DA is accessing their media.
on/off, indicates whether the access to the media should be toggled on or off.
Returns: consentanswer_list is an answer from participants giving their consent. It should be noted that the participant identities may be obfuscated.

This mechanism allows the OTT DA to get not just the media coming from its served user but from all the call participants, after they consent to it. The OTT DA may then implement use cases such as e.g. recording and storing a call in the OTT platform or sharing the OTT DA among all call participants.

Figure 4:
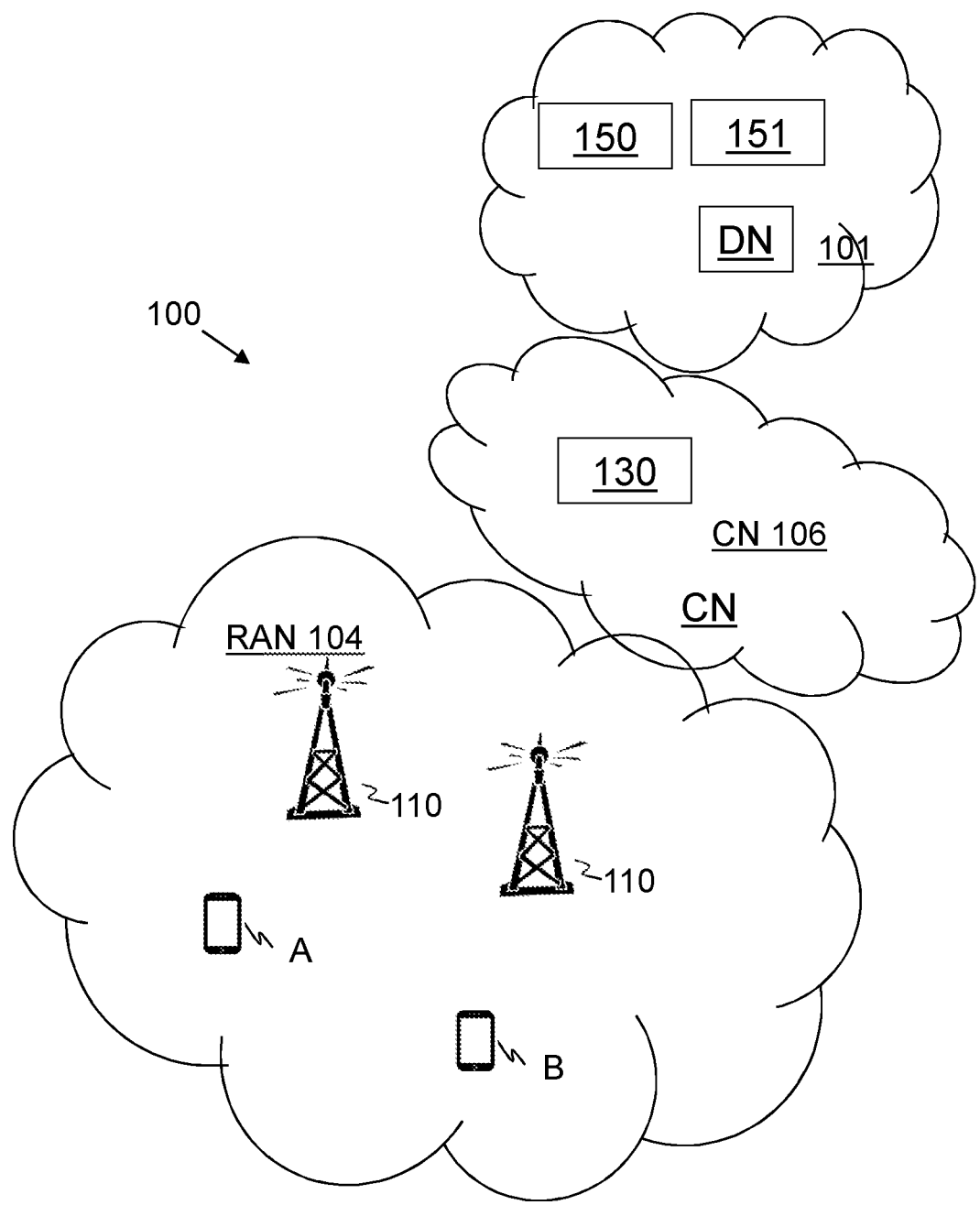
FIG. 4 is a schematic block diagram illustrating embodiments of a communications network.

FIG. 4 is a schematic overview depicting a communications network 100 wherein embodiments herein may be implemented. The communications network 100 may be a wireless communications network and comprises one or more RANs 104 and one or more CNs 106. The wireless communications network 100 may use 5G NR but may further use a number of other different technologies, such as, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as one or more radio network nodes 110 providing radio coverage to UEs in the Each radio network node 110 provides radio coverage over a geographical area by means of antenna beams. The geographical area may be referred to as a cell, a service area, beam or a group of beams. The radio network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by the radio network node 110 depending e.g. on the radio access technology and terminology used.

UEs such as a first UE A and a second UE B operate in the communication network 100. The UEs A and B may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "UE" is a non-limiting term which means any terminal, wireless communication terminal, wireless device, Device to Device (D2D) terminal, or node e.g. smart phone, laptop, mobile phone, sensor, relay, mobile tablets, television units or even a small base station communicating within a cell. According to example embodiments herein, the UEs A and B are connected in call, referred to as a conference wherein first UE A is a first participant A in the call and wherein the second UE B is a second participant B in the call.

An OTT DA 125 operates in the communications network 100. The OTT DA 125 may e.g. be a DA comprised in a an OTT DA platform also referred to as a OTT platform 151, e.g. in a cloud 101. When used herein, the OTT DA 125 and the OTT platform 151 may be seen as one unit, i.e. that the OTT DA 125 is associated with or comprises the OTT platform 151. An OTT client is the entity that sends the requests towards the skills server.

The CN further comprises a core network node such as the IMS node 130 comprised in an IMS network. the IMS node 130 is used for serving requests coming via a Service Exposure API.

Figure 1:
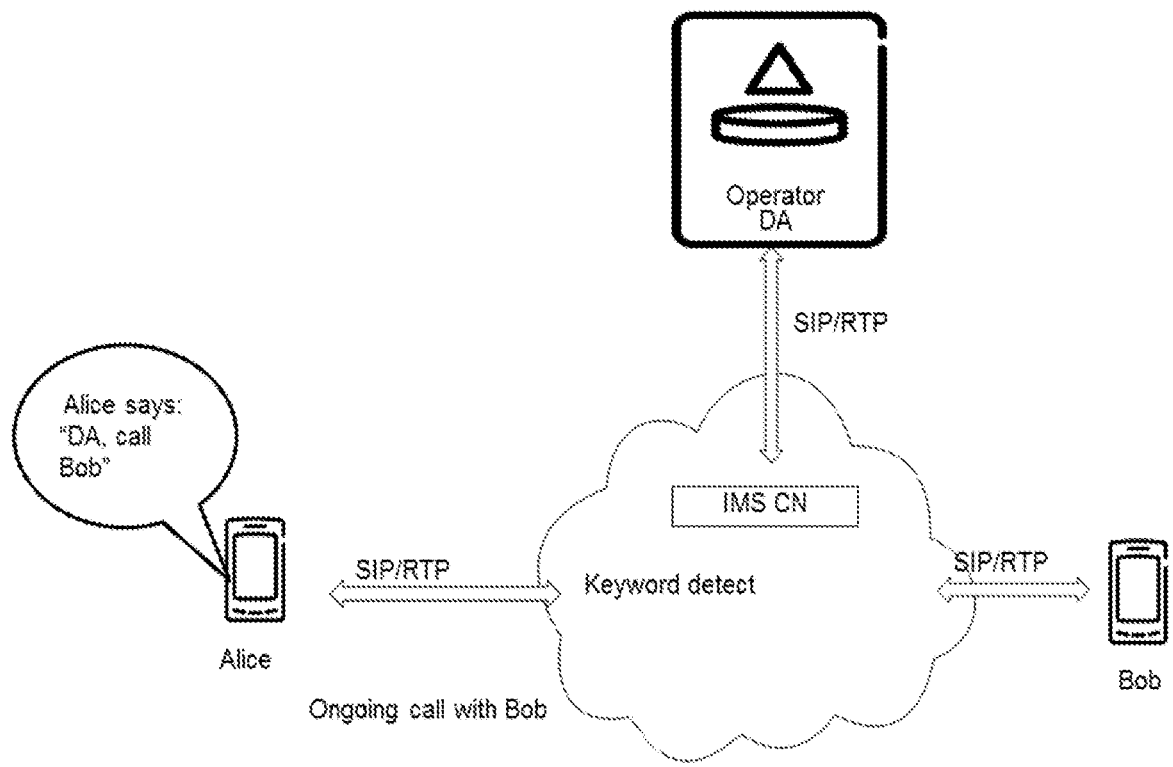
FIG. 1 is a schematic block diagram illustrating prior art.
Figure 2:
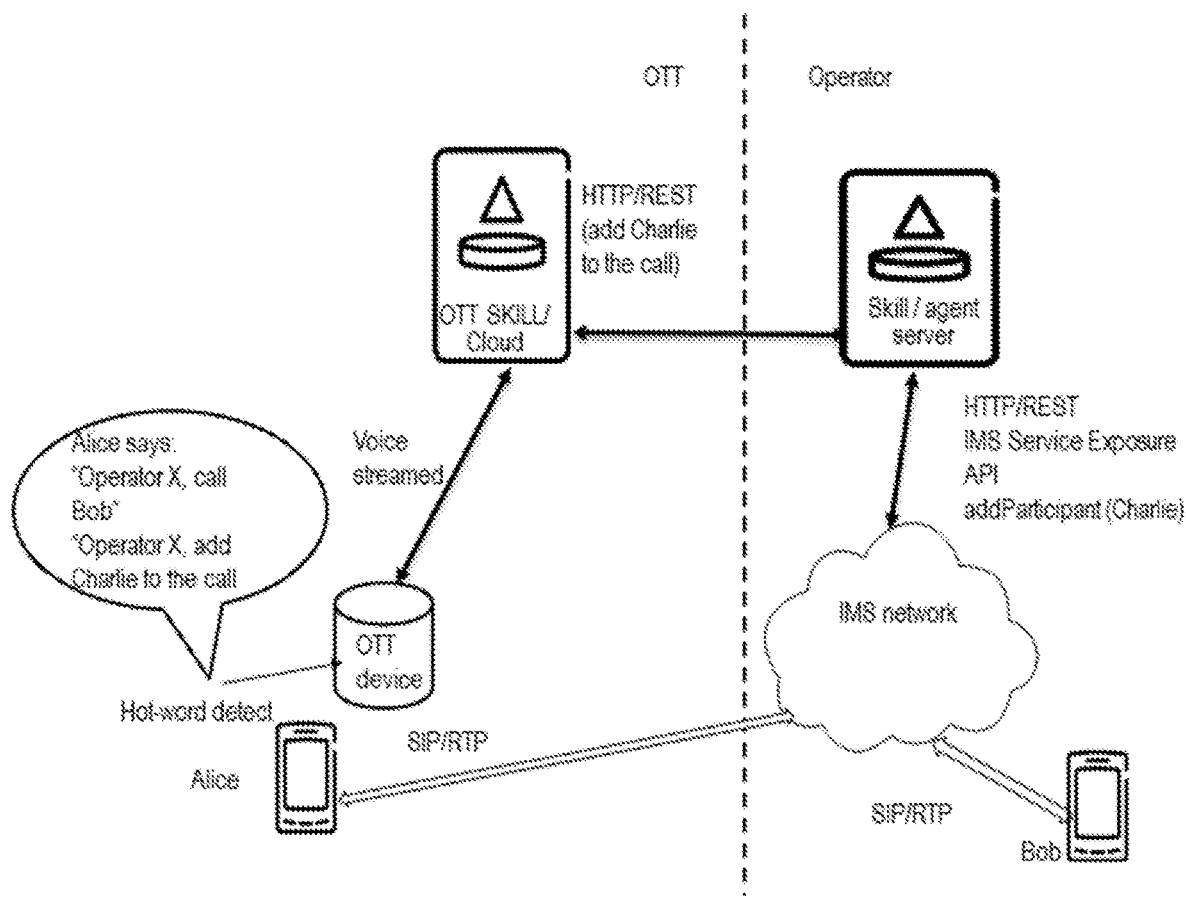
FIG. 2 is a schematic block diagram illustrating prior art.

The IMS node 130 may be connected to a network node 150. The network node 150 may be located in the cloud 101 as depicted in FIG. 1, in the CN or in a third Party domain of the communications network. The network node 150 may be a server such as a skill server or an agent server.

Furthermore, the OTT DA 125 and the network node 150 may be collocated nodes, stand-alone nodes or distributed nodes comprised in the cloud 101.

Figure 5:
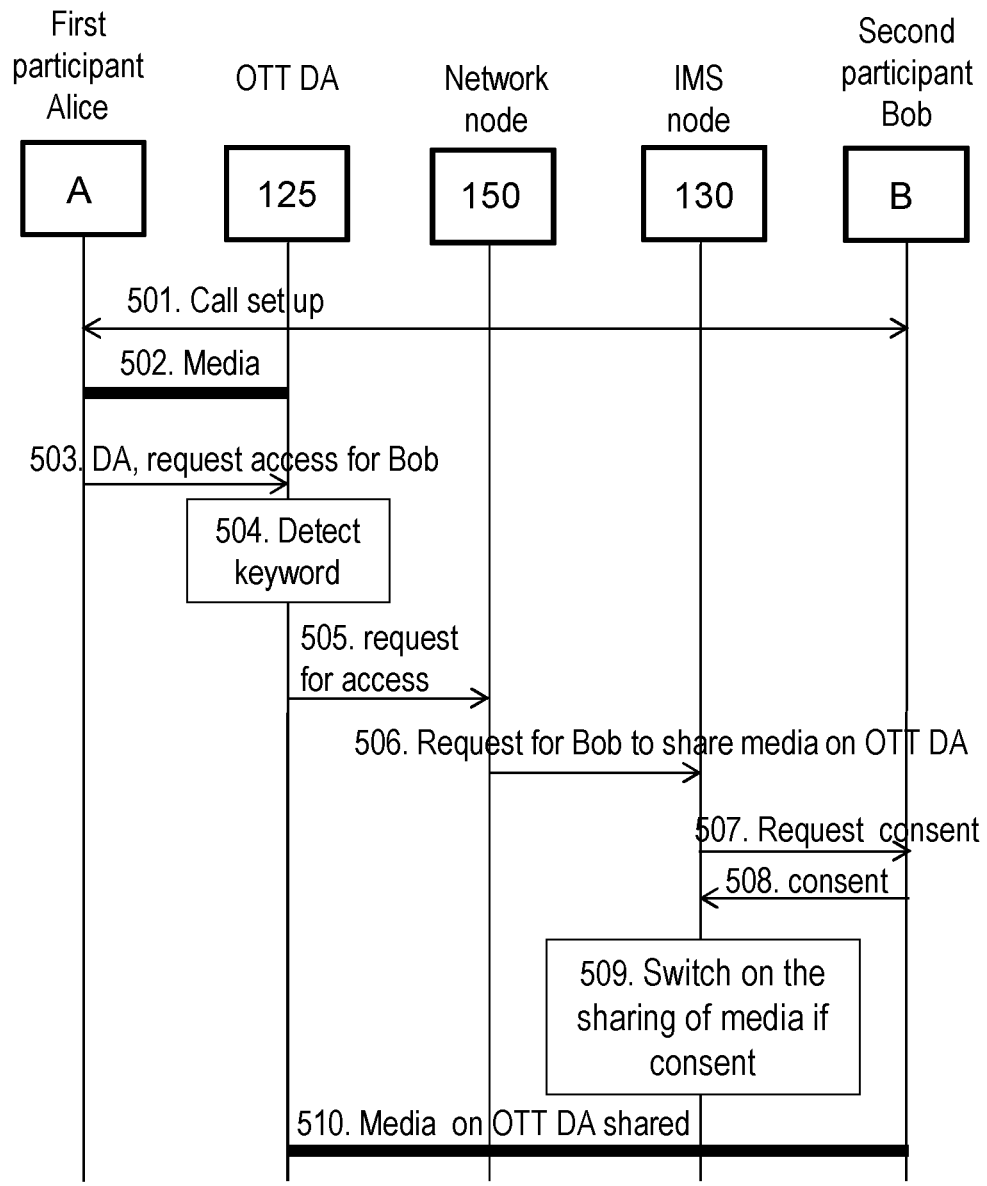
FIG. 5 is a sequence diagram depicting an embodiments of a method in a communications network.

The method will first be described from a helicopter perspective as a signalling diagram showing the involved nodes such as the OTT DA 125, the network node 110, and the IMS node 130 with reference to FIG. 5. Thereafter embodiments of the method as seen from the perspective of each respective net the OTT DA 125, the network node 110, and the IMS node 130 will be individually described one by one with reference to respective flow charts of FIGS. 6, 7 and 8.

An example scenario of embodiments herein before starting the method may be:

Alice is a OTT DA 125 user, she owns the OTT DA 125 which is in this example a DA. Alice is in a conference call with another user Bob. Alice is a first participant A in the conference call and Bob is a second participant B in the conference call. Alice has already access to the OTT DA 125, e.g. since she owns it. The OTT DA 125 may be seen as a participant in the conference call. However, Bob has not access to the OTT DA 125 yet, so his media is not shared at the OTT DA 125. The conference call may be referred to as call or media call.

Alice wants to share media in the OTT DA 125 from other participants in the conference call, such as the second participant B.

Example embodiments of a method performed in the communications network 100 for handling access to sharing media in a media session in the OTT DA 125, will now be described with reference to a sequence diagram depicted in FIG. 5. In this example the first participant A is referred to as Alice, and the second participant B a is referred to as Bob.

Action 501. Alice sets up a call such as a media session with Bob. Initial media of the media session flows from the IMS Core Network, such as the IMS node 130, to and from Alice and Bob. At this point also the media from Alice is going towards OTT DA 125.

Action 502. Media from the OTT DA 125 is sent to both Alice and Bob, but no media from Bob is sent in the OTT DA 125 respecting Bob's privacy. In this example, the first participant Alice is associated to e.g. owns the OTT DA 125. Therefore, only media such as the voice from Alice is, in some embodiments automatically, uploaded to the OTT DA 125, in this example represented by a OTT.

Action 503. Alice says one or more intents to the OTT DA 125, such as e.g.: DA, request access for the participant Bob, or DA, request access for all participants, if more participants than Bob.

Action 504. The OTT DA 125 detects the one or more keywords said by Alice. The keywords will trigger the OTT DA 125, e.g. its associated OTT DA platform 151. The OTT DA 125 may just detect the keyword, later on it is up to the OTT DA platform 151 to process the intents and send to the configured network node 150 such as the skill server, to act according to some predetermined rules. In this example this starts the process of request an accept from Bob if Bob accepts to share his media on the OTT DA 125. The accept is also referred to as authorization and consensus.

Action 505. Thus, upon detecting the one or more keywords, the OTT DA 125 sends via the OTT DA platform 151 to the network node 150 to process the intents and to send a request for access, which in this example is an agent server. The request for access relates to the first participant Alice requesting access for the second participant Bob to share media in the media session in the OTT DA 125.

Action 506. Based on the one or more keywords, the network node 150 may retrieve e.g. create information e.g. a list of participants comprising at least the second participant Bob, that the first participant Alice wishes to share the media with in the OTT DA 125. This means that the OTT DA 125 detects the keyword if it is wanted that the second participant Bob to be able to use it, or the OTT platform 151 of the OTT DA 125 if it is wanted to do services as recording.

The network node 150 has access to the IMS node 130 and therefore sends the request for access IMS node 130, requesting access for Bob to share media of the media session in the OTT DA 125. The request for access may comprise the list of participants that the first participant Alice wishes to share the media with in the OTT DA 125.

Action 507. The IMS node 130 receives the request for access from the network node 150, e.g. comprising the list of participants that the first participant Alice wishes to share the media with in the OTT DA 125. Upon receiving the request for access list of participants comprising at least the second participant Bob, the IMS node 130 sends a request to the second participant Bob to authorise the sharing of the media of the media session in the OTT DA 125 for the second participant Bob.

Action 508. Bob receives the request and responds in Action 509, to the IMS node 130, whether or not the sharing of the media of the media session in the OTT DA 125 for Bob is authorised.

Action 509 The IMS node 130 receives the response from Bob, and only triggers to switch on the sharing of media of the media session in the OTT DA 125 for the second participant Bob if authorized by Bob in the response.

Action 510. So, if authorized by Bob also media from Bob is sent to the OTT DA 125.

The media is shared between a first participant A and a second participant B in a communications network 100, which first participant A has access to sharing B's media in the media session with the OTT DA 125, wherein the OTT DA 125 may be a participant on the media session.

Method in the OTT DA 125

Example embodiments of a method performed by a method performed by the OTT DA 125 for handling an access to share media in a media session in the OTT DA 125, will now be described with reference to a flowchart depicted in FIG. 6.

The media shall be shared between the first participant A and the second participant B in the communications network 100. The first participant A has access to sharing media in the media session in the OTT DA 125. The OTT DA 125 e.g. is a participant on the media session. Further, in some embodiments, the network node 150 is collocated with the OTT DA 125.

As mentioned above, the first participant A has access to sharing media in the media session in the OTT DA 125. This means that initially, only the first participant A e.g. Alice's media is being sent towards the OTT DA 125 also referred to as the digital assistant, meanwhile the second participant B e.g. Bob can listen and/or see the media coming from both Alice and the OTT DA 125.

Action 601

The OTT DA 125 receives a request for access from the first participant A. The request relates to the first participant A requesting access for the second participant B to sharing media of the media session in the OTT DA 125. The request is received as a intent chosen by the first participant A to activate a request for access. The request is received as an intent. Keyword is used to wake up the logic, intent is the logic requested. As mentioned above the request comes as a hotword to wake up the DA" and "keywords defining the intent or request.

E.g. the first participant Alice says one or more intents to the OTT DA 125, such as e.g.: DA, request access for the second participant Bob, Action 602

Triggered by the intent, the OTT DA 125 sends the request via a network node 150, such as an agent server, to the IMS node 130 in the communications network 100. May be referred to as triggered by the keyword, the OTT DA 125 sends the request corresponding to the intent. This is to trigger the IMS node 130 to switch on the sharing of media in the media session in the OTT DA 125 for the second participant B when authorised by the second participant B.

Method in the Network Node 150

Example embodiments of a method performed by a method performed by the network node 150 for handling an access to share media in a media session in the OTT DA 125, will now be described with reference to a flowchart depicted in FIG. 7. The media shall be shared between the first participant A and the second participant B in the communications network 100. The first participant A has access to sharing media in the media session in the OTT DA 125. The OTT DA 125 e.g. is a participant on the media session. The network node 150 may e.g. be represented by any one out of: an agent server, a skill server, an actions server, a capsules server. Further, in some embodiments, the network node 150 is collocated with the OTT DA 125.

The method comprises the following actions, which actions may be taken in any suitable order.

Action 701

E.g. the first participant A, who already has access to share media in the media session in the OTT DA 125, asks for participants such as all other participants in the conference call including the second participant B, to have access to share media in the media session in the OTT DA 125. This is performed to start the process of receiving consensus also referred to as acknowledge, from the other participants before accessing the other participants to share media in the media session in the OTT DA 125. Thus, the network node 150 receives a request for access from the OTT DA 125. The request for access relates to the first participant A requesting access for the second participant B to sharing media in the media session in the OTT DA 125. The request is sent to the network node 150, such as e.g. the skill or agent server, since it acts like a gateway into the IMS network and knows to which IMS node the request shall be sent. The IMS node 130 exposes IMS capabilities via some API-s. The OTT cloud cannot really speak the IMS "language" so the network node such as the skill server is needed to analyse the request coming from the OTT cloud and translate it to the IMS API-s.

Action 702

As mentioned above, the network node 150, such as e.g. the skill or agent server, knows where to send the request and therefore forwards the request to the correct IMS node, here the IMS node 130. The network node 150 forwards the request to the IMS node 130 in the communications network 100. This is to trigger the IMS node 130 to switch on the sharing of media in the media session in the OTT DA 125 for the second participant B, when authorised by the participant B. The IMS node 130 will take care of the obtaining of the authorizations from the concerning participants, by sending requests to each respective concerning participant. The IMS node 130 will trigger to switch on the sharing of media in the media session in the OTT DA 125 for each respective participant, including the second participant B, only when authorised by the respective participant.

Method in the IMS Node 130

Figure 8:
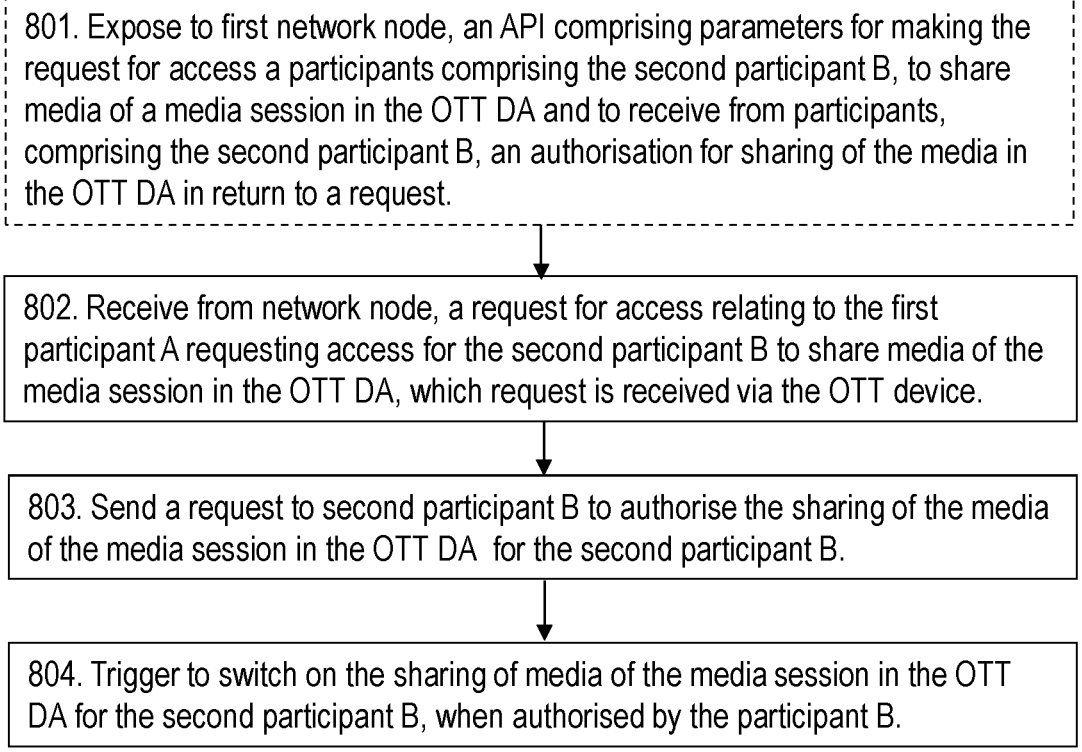
FIG. 8 is a flowchart depicting embodiments of a method in an IMS node.

Example embodiments of a method performed by a method performed by the IMS node 130 for handling an access to share media in a media session in the OTT DA 125, will now be described with reference to a flowchart depicted in FIG. 8. The media shall be shared between the first participant A and the second participant B in the communications network 100. The first participant A has access to sharing media in the media session in the OTT DA 125. The OTT DA 125 e.g. is a participant on the media session.

The method comprises the following actions, which actions may be taken in any suitable order.

Action 801

In some embodiments, the IMS node 130 exposes an Application Program Interface (API) to the network node 150. It may only be the network node 150 that knows how to talk to the IMS node and can translate from the OTT platform or OTT DA 125 "language" to the IMS "language". Every different OTT DA have a different interface, so it is up to the network node 150 to translate to the one that IMS is offering. The wording to expose the API when used herein, means to enable some actions to be accessed through some means. The API comprises parameters for making the request for access a participants, comprising the second participant B, to share media of a media session in the OTT DA 125. And further, to receive from participants, comprising the second participant B, an authorisation for sharing of the media in the OTT DA 125 in return to a request. API parameters when used herein means the needed input for the requested actions to be executed.

The API parameters may relate to any one out of:
A list of participants, comprising the second participant B, that the OTT DA 125 wants to access the media,
a message informing the participants, comprising the second participant (B), about whether the OTT DA 125 is accessing their media, and
an indication whether the access to the media should be switched on or off.

Action 802
The IMS node 130 receives a request for access from the network node 150. The request relates to the first participant A requesting access for the second participant B to sharing media of the media session in the OTT DA 125.

Action 803
The IMS node 130 sends a request to the second participant B to authorise the sharing of the media of the media session in the OTT DA 125 for the second participant B.

Action 804
The IMS node 130 is then triggered to switch on the sharing of media of the media session in the OTT DA 125 for the second participant B, when authorised by the participant B.

Embodiments herein such as mentioned above will now be further described and exemplified with the following example. The text below is applicable to and may be combined with any suitable embodiment described above.

Initial Media Flows from the IMS Node 130

Figure 9:
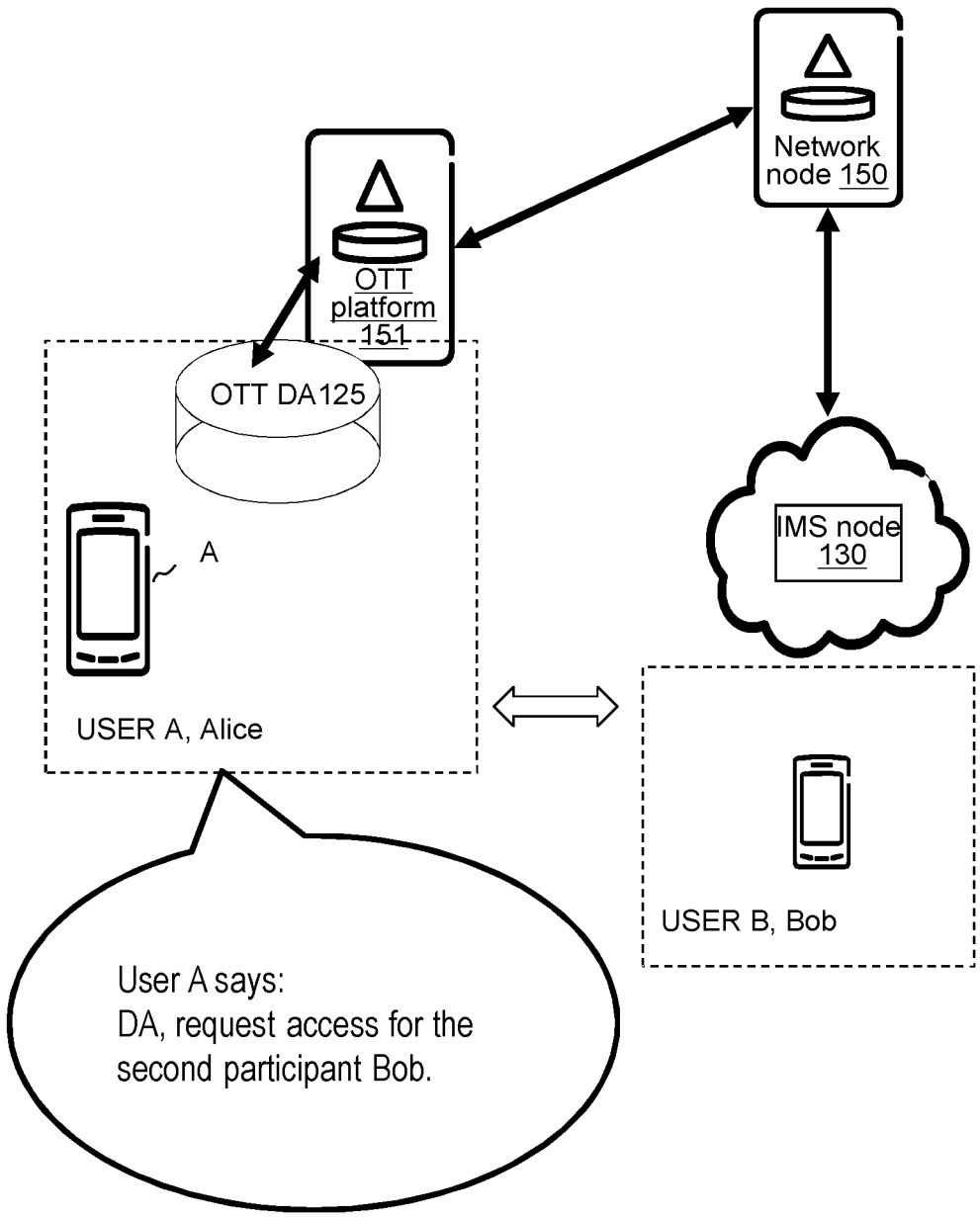
FIG. 9 is a schematic overview depicting embodiments of a communications network.

In this example scenario, depicted in FIG. 9, Alice is the OTT DA 125 user, she owns the OTT DA 125 which is in this example a DA. Alice is in a conference call with another user Bob. Alice is a first participant A in the conference call and Bob is a second participant B in the conference call. Alice has already access to the OTT DA 125, e.g. since she owns it. The OTT DA 125 may be seen as a participant in the conference call. However, Bob has not access to the OTT DA 125 yet, so his media is not shared at the OTT DA 125. The conference call may be referred to as call or media call.

Alice wants to share media in the OTT DA 125 from other participants in the conference call, such as the second participant B.

It should be noted that the wordings Alice and first participant A may be used interchangeable. Further, the wordings Bob and second participant B may be used interchangeable. The wordings OTT platform, and OTT DA 125 and Digital Assistant (DA) may be used interchangeable.

This means that initially, only the first participant A e.g. Alice's media is being sent towards the OTT DA 125 also referred to as the digital assistant, meanwhile the second participant B e.g. Bob can listen and/or see the media coming from both Alice and the OTT DA 125.

This means that initially default status when setting up a call with Bob is that no media from Bob is sent to the OTT DA 125 respecting Bob's privacy. Therefore: The OTT platform 151 of the OTT DA 125 cannot perform any service involving Bob's media, like serving request from Bob or do any king of processing of Bob's media.

Real-Time Transport Protocol (RTP) data is only sent/received by the IMS node 130 to and from the OTT DA 125 for Alice.
RTP data is sent/received by the IMS node 130 both to and from Alice for the OTT DA 125 and Bob for Alice.
RTP data is sent/received by the IMS node 130 both to and from Bob for the OTT DA 125 and Bob, for Bob.

In other words, initial media flows from the IMS node 130 according to the following: Only the voice from Alice is going to the OTT DA 125, media from OTT DA 125 is sent to both Alice and Bob. Media from Bob is sent to Alice.

Request Access for Media Call or Call Participants

According to the example, the API exposed to the network node 150 by the IMS node 130 comprises Request consent and access (on/off) to the media. This e.g. means that if it is "on" the IMS node 130 will request the consent from Bob and in affirmative case the IMS node 130 will forward Bobs media to the OTT DA 125. If it is "off" then the IMS node 130 will stop forwarding Bob's media to the OTT DA 125.

Access for media of call participant(s) is requested, e.g. Alice says the intents "DA, request access for all participants' media". The keyword detection is done in-call by the OTT DA 125, which is one of the call participants. Thus the OTT DA 125 detects the keywords and request access to the network node 150 which e.g. may be a Skill server or an agent server, by using IMS node exposed APIs: HTTP/REST HotWordDetect request Fulfillment.

The network node 150 has access to the IMS node 130 via API. Thereby the OTT platform 151 of the OTT DA 125 may via the network node 150, access the IMS node 130 and perform services e.g. towards a node inside the IMS network, this may be any Application Server where the service exposure APIs are available. This may be implemented in the Multimedia Telephony service (MMTel) Application Server (AS) for instance or develop one specific just for this. Service Exposure is needed. This means that the Application Server inside the IMS will serve the requests got using the exposed APIs. Thus the network node 150 forwards the request to the IMS node 130 using IMS node exposed APIs: HTTP/REST, which is an example of what kind of interface or "language" the API is using, AccessMediaParticipant.

The IMS node 130 sends and audio or a text message to the call participant such as to Bob, asking or informing about the media access request, also referred to as requesting authorisation from the second participant B.

IMS exposed APIs may comprise AUDIO or TEXT informing or asking for media access.

Depending on the legal regulations, it may happen that the call participants need to give explicit permission or only need to be informed about the media access request. Once the request has been granted by the IMS node 130, the media flows will end up with RTP data flow is sent/received by the IMS node 130 to and from the OTT DA 125 for both Alice and Bob.

This means that the OTT DA 125 has now access to some participants', e.g. the second participant Bob's or all participants' media depending if the access has been granted or not, i.e. if authorized by them. The wordings media and data may be used interchangeable.

It should be noted that this example embodiment may be generalized for the case where there are many participants in the call like in a conference call.

Thus, embodiments herein provide exposure from the IMS network such as the IMS node 130 to share the user's OTT DA 125 with the call participants after gathering their consent.

Figure 10A:
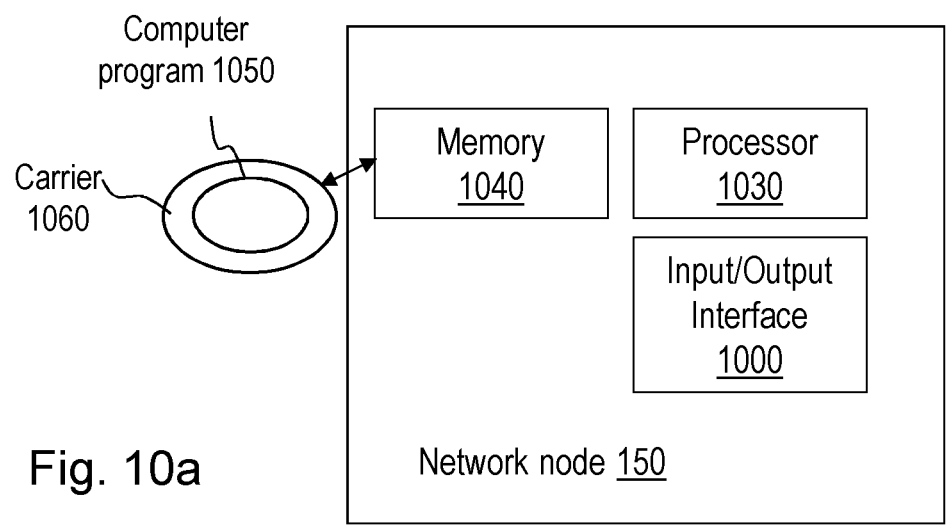
FIGS. 10a and 10b are schematic block diagrams illustrating embodiments of a network node.
Figure 10B:
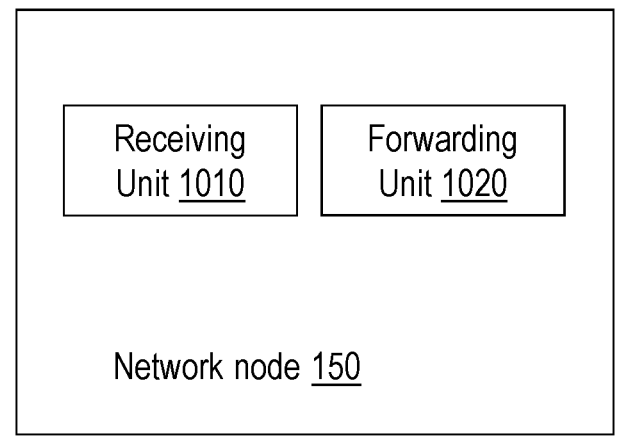

To perform the method actions above, the network node 150 is configured to handle an access to sharing media in a media session in the OTT DA 125, and the network node 150 may comprise the arrangement depicted in FIG. 10a and FIG. 10b. The media shall be shared between the first participant A and a second participant B in the communications network 100. The first participant A is adapted to have access to sharing media in the media session in the OTT DA 125. The OTT DA 125 may be adapted to be a participant on the media session.

The network node 150 may comprise an input and output interface 1000 depicted in FIG. 10a, configured to communicate e.g. with the IMS node 130 and the OTT DA 125. The input and output interface 1000 may comprise a receiver (not shown) and a transmitter (not shown).

The network node 150 is configured to, e.g. by means of a receiving unit 1010 in the network node 110 depicted in FIG. 10b, receive from the OTT DA 125, a request for access. The request is adapted to relate to the first participant A requesting access for the second participant B to share media of the media session in the OTT DA 125.

The network node 150 is further configured to, e.g. by means of a forwarding unit 1020 in the network node 110 depicted in FIG. 10b, forward the request to an IMS node 130 in the communications network 100, to trigger the IMS node 130 to switch on the sharing of media of the media session in the OTT DA 125 for the second participant B when authorised by the participant B.

The network node 150 may be adapted to be represented by a server. Different OTT's use different names for these servers. E.g. any one out of: an agent server, a skill server as used by Amazon Alexa, Actions used by Google, Capsules used by Samsung and there are many others.

The network node 150 may be adapted to be collocated with the OTT DA 125.

The embodiments herein may be implemented through a respective processor or one or more processors, such as a processor 1030 of a processing circuitry in the network node 150 depicted in FIG. 10a, together with a respective computer program code for performing the functions and actions of the embodiments herein. The program code mentioned above may also be provided as a computer program product, for instance in the form of a data carrier carrying computer program code for performing the embodiments herein when being loaded into the network node 150. One such carrier may be in the form of a CD ROM disc. It is however feasible with other data carriers such as a memory stick. The computer program code may furthermore be provided as pure program code on a server and downloaded to the network node 150.

The network node 110 may further comprise a memory 1040 depicted in FIG. 10a, comprising one or more memory units to store data on. The memory 1040 comprises instructions executable by the processor 1030. The memory 1040 is arranged to be used to store e.g. intents, instructions, configurations and applications to perform the methods herein when being executed in the network node 150.

Those skilled in the art will also appreciate that the units in the radio network node 150 mentioned above may refer to a combination of analogue and digital circuits, and/or one or more processors configured with software and/or firmware, e.g. stored in the network node 150 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1050 comprises instructions, which when executed by the respective at least one processor 1030, cause the at least one processor 1030 of the network node 110 to perform the actions above.

In some embodiments, a carrier 1060 comprises the computer program 1050, wherein the carrier 1060 is one of an electronic signal, an optical signal, an electromagnetic signal, a magnetic signal, an electric signal, a radio signal, a microwave signal, or a computer-readable storage medium.

Figure 11A:
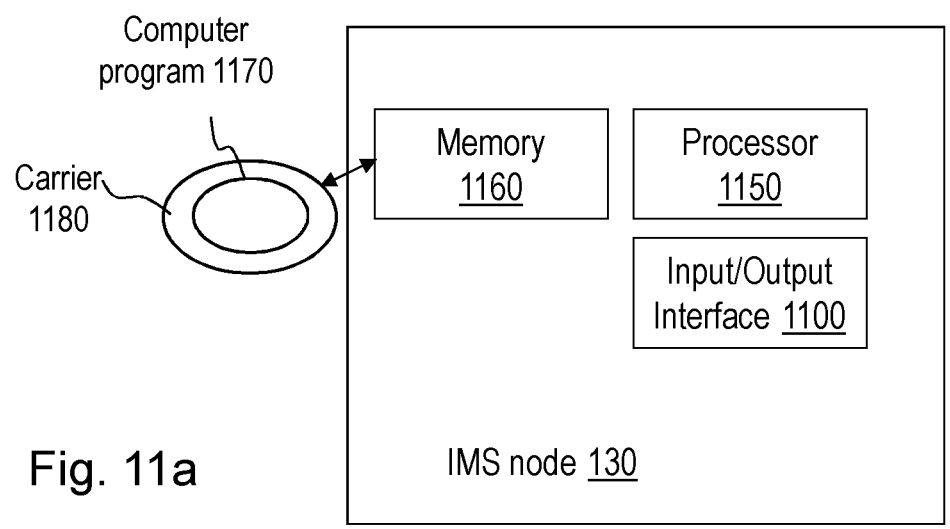
FIGS. 11a and 11b are schematic block diagrams illustrating embodiments of an IMS node.
Figure 11B:
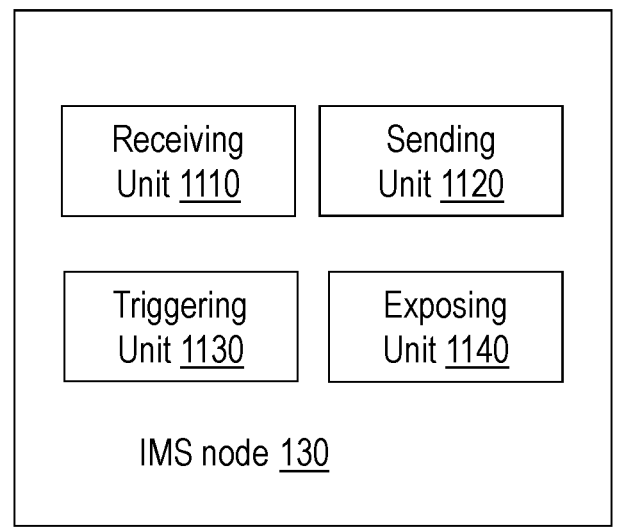

To perform the method actions above the IMS node 130 is configured to handle access to sharing media of a media session in the device 125, and the IMS node 130 may comprise the arrangement depicted in FIG. 11a and FIG. 11b. The media is to be shared between a first participant A and a second participant B in the communications network 100. The first participant A has access to share media in the media session in the OTT DA 125. The OTT DA 125 may be adapted to be a participant on the media session.

The IMS node 130 may comprise an input and output interface 1100 depicted in FIG. 11a, configured to communicate e.g. with the network node 150 and the OTT DA 125. The input and output interface 1100 may comprise a receiver (not shown) and a transmitter (not shown).

The IMS node 130 is configured to, e.g. by means of a receiving unit 1110 in the IMS node 130 depicted in FIG. 11b, receive a request for access from the network node 150. The request relates to the first participant A requesting access for the second participant B to sharing media of the media session in the OTT DA 125. The request is adapted to be received via the OTT DA 125.

The IMS node 130 is further configured to, e.g. by means of a sending unit 1120 in the IMS node 130 depicted in FIG. 11b, send a request to the second participant B to authorise the sharing of the media of the media session in the OTT DA 125 for the second participant B.

The IMS node 130 is configured to, e.g. by means of a triggering unit 1130 in the IMS node 130 depicted in FIG. 11b, trigger to switch on the sharing of media of the media session in the OTT DA 125 for the second participant B, when authorised by the participant B.

In some embodiments, the IMS node 130 is configured to, e.g. by means of a exposing unit 1140 in the IMS node 130 depicted in FIG. 11b, expose to the network node 150, an API comprising parameters for making the request for access a participants comprising the second participant B, to share media of a media session in the OTT DA 125 and to receive from participants comprising the second participant B, an authorisation for sharing of the media in the OTT DA 125 in return to a request.

The API parameters may be adapted to relate to any one out of: A list of participants, comprising the second participant B, the OTT DA 125 wants to access the media, a message informing the participants, comprising the second participant B, about whether the OTT DA 125 is accessing their media, and an indication whether the access to the media should be switched on or off.

Figure 3:
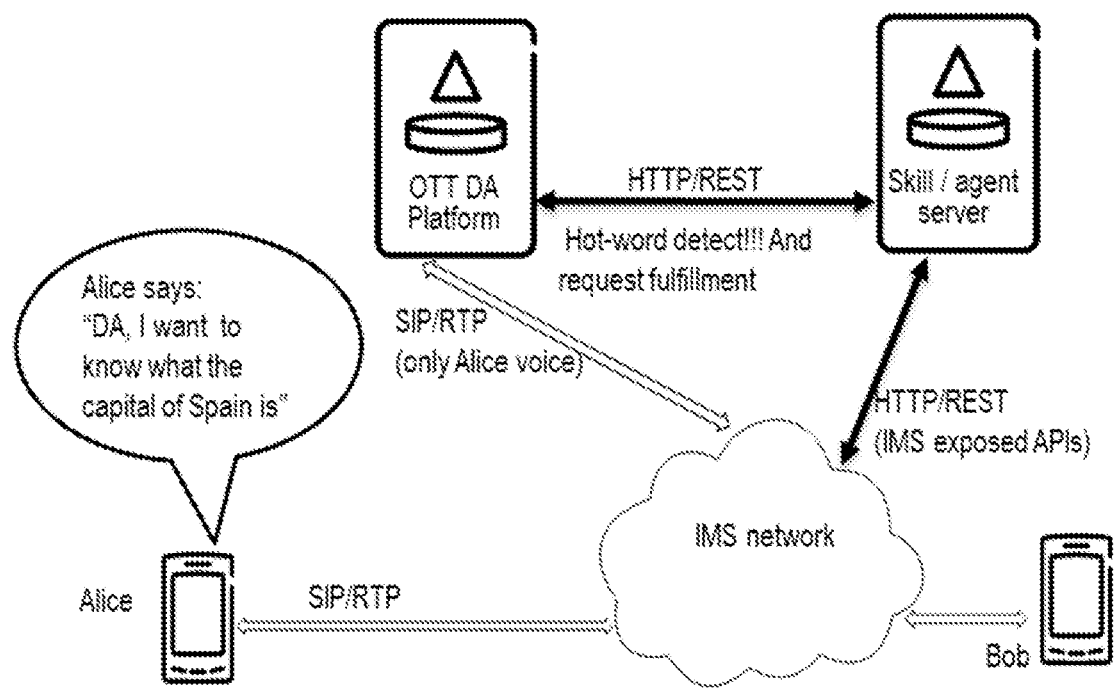
FIG. 3 is a schematic block diagram illustrating prior art.

The embodiments herein may be implemented through a respective processor or one or more processors, such as a processor 1150 of a processing circuitry in the IMS node 130 depicted in FIG. 3, together with a respective computer program code for performing the functions and actions of the embodiments herein. The program code mentioned above may also be provided as a computer program product, for instance in the form of a data carrier carrying computer program code for performing the embodiments herein when being loaded into the IMS node 130. One such carrier may be in the form of a CD ROM disc. It is however feasible with other data carriers such as a memory stick. The computer program code may furthermore be provided as pure program code on a server and downloaded to the IMS node 130.

The IMS node 130 may further comprise a memory 1160 comprising one or more memory units to store data on. The memory comprises instructions executable by the processor 1150. The memory 1160 is arranged to be used to store e.g. intents, instructions, configurations and applications to perform the methods herein when being executed in the IMS node 130.

Those skilled in the art will also appreciate that the units in the radio IMS node 130 mentioned above may refer to a combination of analogue and digital circuits, and/or one or more processors configured with software and/or firmware, e.g. stored in the IMS node 130 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1170 comprises instructions, which when executed by the respective at least one processor 1150, cause the at least one processor 1150 of the network node 110 to perform the actions above.

In some embodiments, a carrier 1180 comprises the computer program 1170, wherein the carrier 1180 is one of an electronic signal, an optical signal, an electromagnetic signal, a magnetic signal, an electric signal, a radio signal, a microwave signal, or a computer-readable storage medium.

Figure 12A:
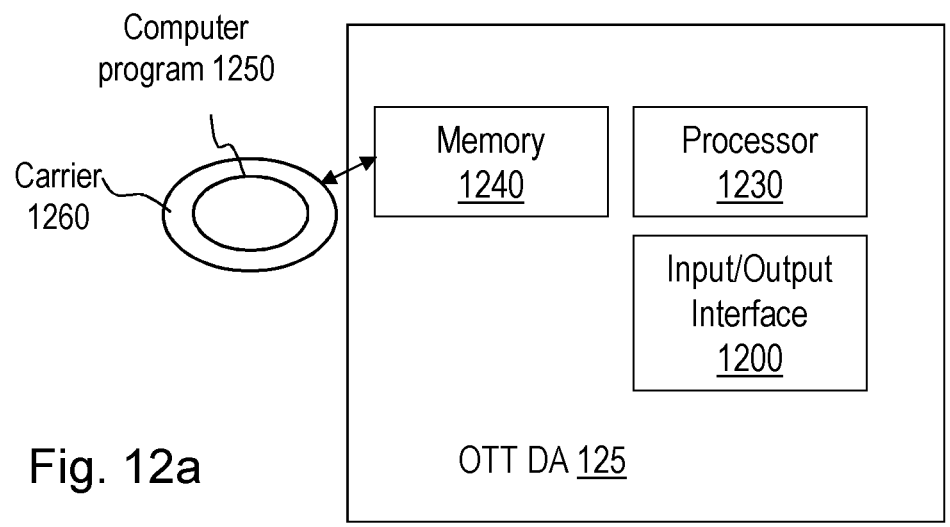
FIGS. 12a and 12b are schematic block diagrams illustrating embodiments of an OTT DA.
Figure 12B:
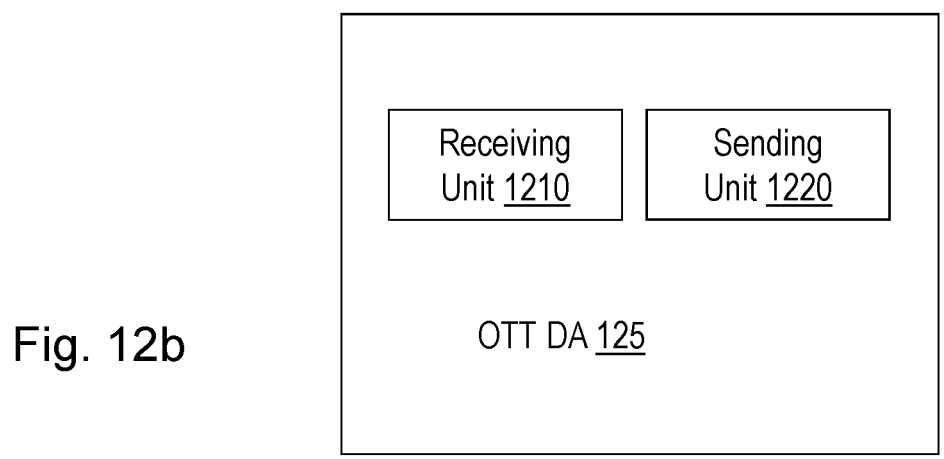

To perform the method actions above, the OTT DA 125 is configured to handle access to sharing media in a media session in an OTT DA 125, and the OTT DA 125 may comprise the arrangement depicted in FIG. 12a and FIG. 12b. The media is adapted to be shared between the first participant A and the second participant B in the communications network 100. The first participant A is adapted to have access to share media in the media session in the OTT DA 125. The OTT DA 125 may be adapted to be a participant in the media session.

The OTT DA 125 may comprise an input and output interface 400 depicted in FIG. 12a, configured to communicate e.g. with the network 150 and the IMS node 130. The input and output interface 1100 may comprise a receiver (not shown) and a transmitter (not shown).

The OTT DA 125 is configured to, e.g. by means of a receiving unit 1210 in the network node 110 depicted in FIG. 12b, receive a request for access from the first participant A. The request for access is adapted to relate to the first participant A requesting access for the second participant B to share media of the media session in the OTT DA 125. The request is adapted to be received as a intent chosen by the first participant A to activate a request for access.

The OTT DA 125 is further configured to, e.g. by means of a sending unit 1220 in the network node 110 depicted in FIG. 12b, when triggered by the intent, send the request for access via a network node 150 agent server to the IMS node 130 in the communications network, to trigger the IMS node 130 to switch on the sharing of media in the media session in the OTT DA 125 for the second participant B, when authorised by the second participant B.

The embodiments herein may be implemented through a respective processor or one or more processors, such as a processor 1230 of a processing circuitry in the OTT DA 125 depicted in FIG. 12a, together with a respective computer program code for performing the functions and actions of the embodiments herein. The program code mentioned above may also be provided as a computer program product, for instance in the form of a data carrier carrying computer program code for performing the embodiments herein when being loaded into the OTT DA 125. One such carrier may be in the form of a CD ROM disc. It is however feasible with other data carriers such as a memory stick. The computer program code may furthermore be provided as pure program code on a server and downloaded to the OTT DA 125.

The OTT DA 125 may further comprise a memory 1240 comprising one or more memory units to store data on. The memory comprises instructions executable by the processor 1230. The memory 1240 is arranged to be used to store e.g. e.g. intents, instructions, configurations and applications to perform the methods herein when being executed in the OTT DA 125.

Those skilled in the art will also appreciate that the units in the OTT DA 125 mentioned above may refer to a combination of analogue and digital circuits, and/or one or more processors configured with software and/or firmware, e.g. stored in the OTT DA 125 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1250 comprises instructions, which when executed by the respective at least one processor 1230, cause the at least one processor 1230 of the OTT DA 125 10 to perform the actions above.

In some embodiments, a carrier 1260 comprises the computer program 1250, wherein the carrier 1260 is one of an electronic signal, an optical signal, an electromagnetic signal, a magnetic signal, an electric signal, a radio signal, a microwave signal, or a computer-readable storage medium.

FURTHER EXTENSIONS AND VARIATIONS

Figure 13:
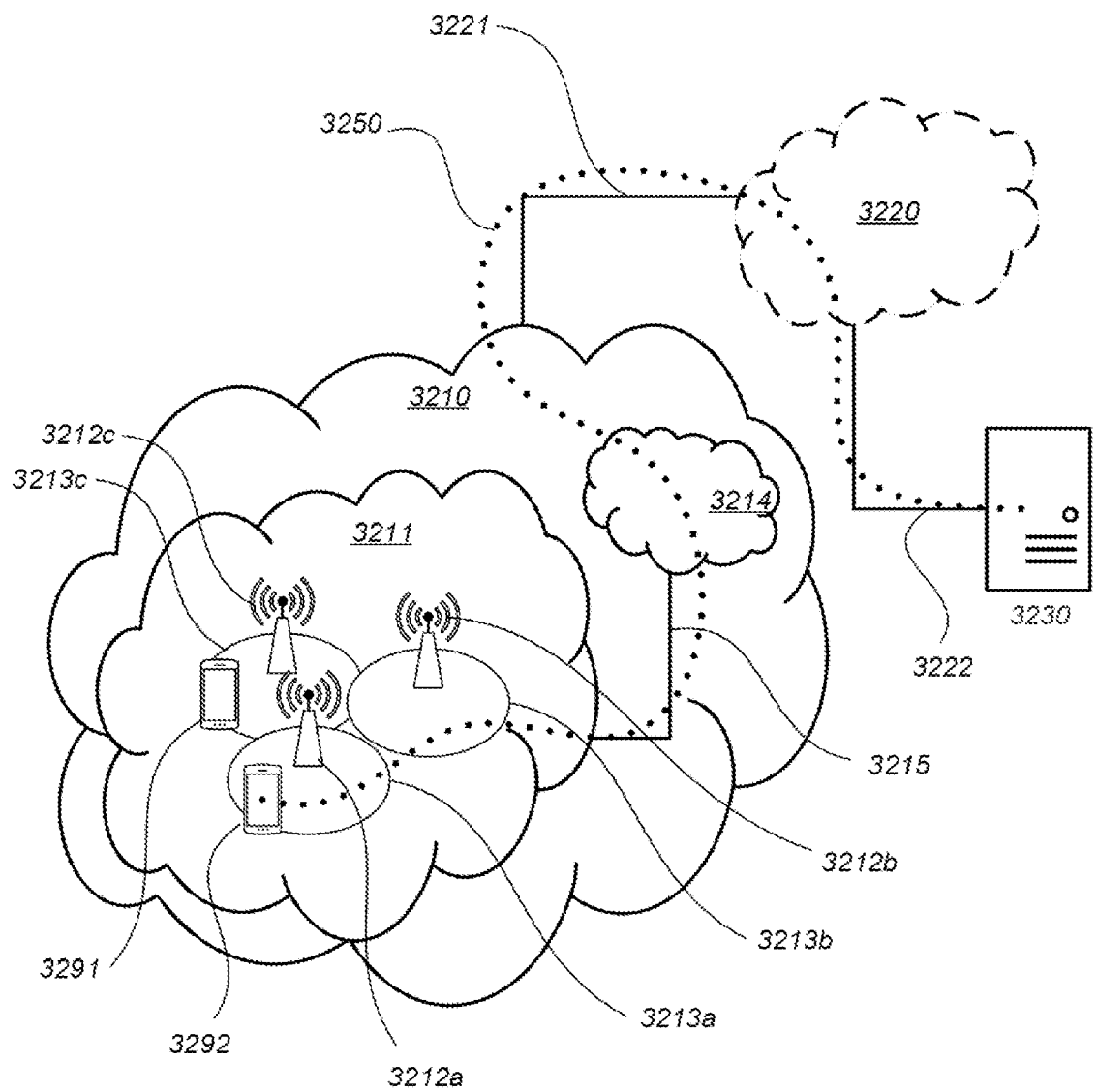
FIG. 13 schematically illustrates a telecommunication network connected via an intermediate network to a host computer.

With reference to FIG. 13, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE A such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
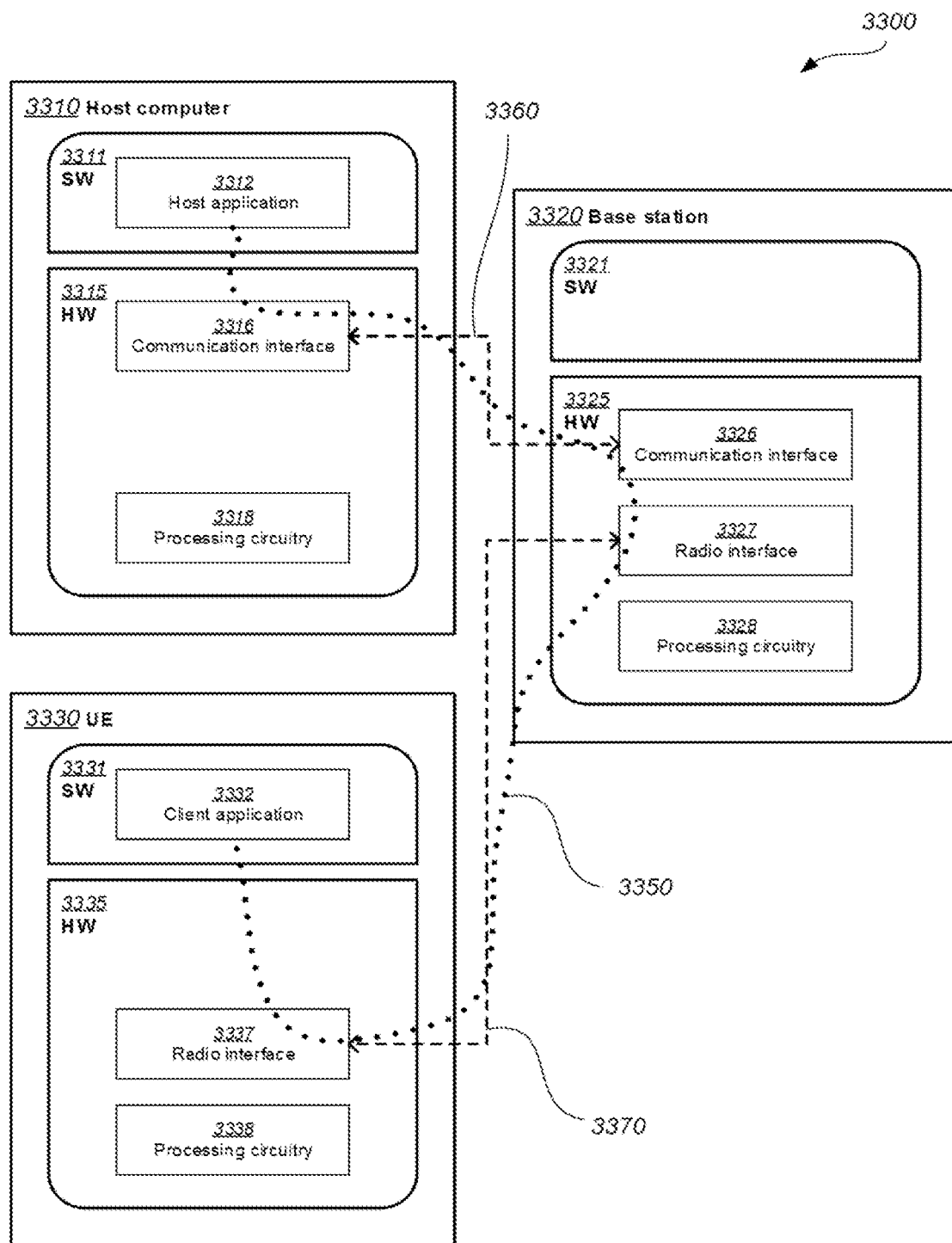
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212a, 3212b, 3212c and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 16 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 17 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 18 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for handling access to sharing media in a media session in an Over The Top (OTT) Digital Assistant (DA), which media is shared between a first participant and a second participant in a communications network, in which the first participant has access to sharing media in the media session in the OTT DA, the method comprising:

receiving from the OTT DA, a request for access, which
request for access relates to the first participant requesting access for the second participant to sharing media in the media session in the OTT DA; and forwarding the request to an IP Multimedia Subsystem (IMS) node in the communications network, to trigger the IMS node to switch on the sharing of media in the media session in the OTT DA for the second participant, when authorised by the second participant, wherein the IMS node exposes to the network node an Application Program Interface (API) comprising parameters for making the request for access of participants to share media of a media session in the OTT DA and to receive from participants an authorisation for sharing of the media in the OTT DA in return to a request for sharing of the media, wherein the IMS node sends a request, via the API, to the second participant to authorise the sharing of the media of the media session in the OTT DA for the second participant, and wherein the IMS node triggers to switch on the sharing of the media of the media session in the OTT DA for the second participant, when authorised by the second participant via the API.

2. The method according to claim 1, wherein the network node is represented by any one out of: an agent server, a skill server, an actions server, or an capsules server.

3. The method according to claim 1, wherein the network node is collocated with the OTT DA.

4. A method performed by an IP Multimedia Subsystem (IMS) node for handling access to sharing media in a media session in an Over The Top (OTT) Digital Assistant (DA), which media is shared between a first participant and a second participant in a communications network, in which the first participant has access to sharing media in the media session in the OTT DA, the method comprising:

exposing to a network node an Application Program Interface (API) comprising parameters for making a request for access of participants to share media of a media session in the OTT DA and to receive from participants an authorisation for sharing of the media in the OTT DA in return to a request for sharing of the media;

receiving from a network node a request for access, which request relates to the first participant requesting access for the second participant to sharing the media of the media session in the OTT DA;

sending a request, via the API, to the second participant to authorise the sharing of the media of the media session in the OTT DA for the second participant; and triggering to switch on the sharing of media of the media session in the OTT DA for the second participant, when authorised by the second participant via the API.

5. The method according to claim 4, wherein the API parameters relate to any one out of:

a list of participants, comprising the second participant, the OTT DA wants to access the media;

a message informing the participants, comprising the second participant, about whether the OTT DA is accessing their media; and an indication whether the access to the media should be switched on or off.

6. A method performed by an Over The Top (OTT) Digital Assistant (DA) for handling access to sharing media in a media session in the OTT DA, which media is shared between a first participant and a second participant in a communications network, in which the first participant has access to sharing media in the media session in the OTT DA, the method comprising:

receiving from the first participant a request for access, which request relates to the first participant requesting access for the second participant to sharing media of the media session in the OTT DA, and which request is received as an intent chosen by the first participant to activate a request for access; and in response to being triggered by the intent, sending the request via a network node to an IP Multimedia Subsystem (IMS) node in the communications network, to trigger the IMS node to switch on the sharing of media in the media session in the OTT DA for the second participant when authorised by the second participant, wherein the IMS node exposes to the network node an Application Program Interface (API) comprising parameters for making the request for access of participants to share media of a media session in the OTT DA and to receive from participants an authorisation for sharing of the media in the OTT DA in return to a request for sharing of the media, wherein the IMS node sends a request, via the API, to the second participant to authorise the sharing of the media of the media session in the OTT DA for the second participant, and wherein the IMS node triggers to switch on the sharing of the media of the media session in the OTT DA for the second participant, when authorised by the second participant via the API.

7. The method according to claim 6, wherein the OTT DA is collocated with the network node.

8. A network node to handle access to sharing media in a media session in an Over The Top (OTT) Digital Assistant (DA), which media is shared between a first participant and a second participant in a communications network, in which the first participant is to have access to sharing media in the media session in the OTT DA, wherein the OTT DA is to be a participant on the media session, the network node comprising:

a processor; and a memory comprising instructions which, when executed by the processor, cause the network node to:

receive from the OTT DA, a request for access, which request is to relate to the first participant requesting access for the second participant to share media of the media session in the OTT DA; and forward the request to an IP Multimedia Subsystem (IMS) node in the communications network, to trigger the IMS node to switch on the sharing of media of the media session in the OTT DA for the second participant when authorised by the second participant, wherein the IMS node exposes to the network node an Application Program Interface (API) comprising parameters for making the request for access of participants to share media of a media session in the OTT DA and to receive from participants an authorisation for sharing of the media in the OTT DA in return to a request for sharing of the media, wherein the IMS node sends a request, via the API, to the second participant to authorise the sharing of the media of the media session in the OTT DA for the second participant, and wherein the IMS node triggers to switch on the sharing of the media of the media session in the OTT DA for the second participant, when authorised by the second participant via the API.

9. The network node according to claim 8, wherein the network node is represented by any one out of: an agent server, a skill server, an actions server, or an capsules server.

10. The network node according to claim 8, wherein the network node is collocated with the OTT DA.

11. An IP Multimedia Subsystem (IMS) node to handle access to sharing media of a media session in an Over The Top (OTT) Digital Assistant, (DA), which media is to be shared between a first participant and a second participant in a communications network, in which the first participant has access to sharing media in the media session in the OTT DA, wherein the OTT DA is a participant on the media session, the IMS node comprising:
- a processor; and
- a memory comprising instructions which, when executed by the processor, cause the IMS node to:
  - expose to a network node an Application Program Interface (API) comprising parameters for making a request for access of participants to share media of a media session in the OTT DA and to receive from participants an authorisation for sharing of the media in the OTT DA in return to a request for sharing of the media;
  - receive a request for access from a network node, which request relates to the first participant requesting access for the second participant to sharing media of the media session in the OTT DA, in which request is received via the OTT DA;
  - send a request, via the API, to the second participant to authorise the sharing of the media of the media session in the OTT DA for the second participant; and
  - trigger to switch on the sharing of media of the media session in the OTT DA for the second participant, when authorised by the second participant via the API.

12. The IMS node according to claim 11, wherein the API parameters are to relate to any one out of:
- a list of participants, comprising the second participant, the OTT DA wants to access the media;
- a message informing the participants, comprising the second participant, about whether the OTT DA is accessing their media; and
- an indication whether the access to the media is to be switched on or off.

13. An Over The Top (OTT) Digital Assistant (DA) for handling access to sharing media in a media session in the OTT DA, which media is to be shared between a first participant and a second participant in a communications network, in which the first participant is to have access to share media in the media session in the OTT DA, and which OTT DA is to be a participant in the media session, the OTT DA comprising:
- a processor; and
- a memory comprising instructions which, when executed by the processor cause the OTT DA to:
  - receive a request for access from the first participant, which request for access is to relate to the first participant requesting access for the second participant to share media of the media session in the OTT DA, and in which the request is to be received as an intent chosen by the first participant to activate a request for access; and
  - in response to being triggered by the intent, send the request for access via a network node to an IP Multimedia Subsystem (IMS) node in the communications network, to trigger the IMS node to switch on the sharing of media in the media session in the OTT DA for the second participant, when authorised by the second participant, wherein the IMS node exposes to the network node an Application Program Interface (API) comprising parameters for making the request for access of participants to share media of a media session in the OTT DA and to receive from participants an authorisation for sharing of the media in the OTT DA in return to a request for sharing of the media, wherein the IMS node sends a request, via the API, to the second participant to authorise the sharing of the media of the media session in the OTT DA for the second participant, and wherein the IMS node triggers to switch on the sharing of the media of the media session in the OTT DA for the second participant, when authorised by the second participant via the API.

* * * * *